(12) United States Patent
Chilamakuri

(10) Patent No.: US 6,285,414 B1
(45) Date of Patent: *Sep. 4, 2001

(54) TELEVISION REMOTE CONTROLLER WITH PROGRAMMABLE CHANNEL DESELECTION

(75) Inventor: Chenchu Lakshmi Chilamakuri, Fremont, CA (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/960,328

(22) Filed: Oct. 29, 1997

(51) Int. Cl.$^7$ ...................................... H04N 5/44
(52) U.S. Cl. ........................ 348/734; 348/731; 348/732
(58) Field of Search .................. 348/731, 732, 348/734, 13, 906; H04N 5/44

(56) References Cited

U.S. PATENT DOCUMENTS

| | | | |
|---|---|---|---|
| 4,495,654 | * 1/1985 | Deiss | 455/151.2 |
| 4,566,034 | * 1/1986 | Harger et al. | 348/734 |
| 4,626,892 | * 12/1986 | Nortrup et al. | 348/569 |
| 5,550,642 | * 8/1996 | Kim et al. | 386/46 |
| 5,805,235 | * 9/1998 | Bedard | 348/569 |
| 5,828,419 | * 10/1998 | Bruette et al. | 348/563 |
| 5,883,680 | * 3/1999 | Nykerk | 348/734 |

* cited by examiner

Primary Examiner—Reinhard J. Eisenzopf
Assistant Examiner—Linus H. Lo
(74) Attorney, Agent, or Firm—Jay H. Maioli

(57) ABSTRACT

A channel selector for a television receiver has a device for deselecting specified channels for a predetermined period of time. When a channel has been deselected it will be skipped when a user "surfs" through the sequence of channels. After the predetermined period of time expires the deselected channel is returned to the sequence of available channels. Channels may be deselected for time periods corresponding to a standard timeslot, for example each half hour. Alternatively, channels may be deselected for periods corresponding to the actual length at the program determined from transmitted program scheduling data.

6 Claims, 4 Drawing Sheets

TELEVISION REMOTE CONTROLLER WITH PROGRAMMABLE CHANNEL DESELECTION

BACKGROUND OF THE INVENTION

This invention relates generally to the field of television channel selection devices and, more particularly, this invention relates to a channel selection device wherein a user can sequentially select each of the available channels.

Television channel selection devices are well known. Remote controllers allow a user to select a desired channel from a remote location, usually by transmitting a coded series of infrared light pulses. Remote controllers allow users to scan through a sequence of channels by pressing a "channel-up" or "channel-down" button that causes the television receiver to display the next successive or previous channel in the sequence of channels. In this way a user can view each of the channels available and select a program.

Given the large number of television channels available from cable television services, a user may scroll through the available channels a number of times before selecting a program. This practice is commonly called "surfing".

Scrolling through large numbers of channels takes a considerable amount of time, so that by the time all the channels are previewed a user may miss a portion of the program he or she wishes to see.

Viewers generally have a better idea of the television programs they do not wish to see than those they do wish to see. A momentary segment of a broadcast is sufficient to indicate the type of program a user does not wish to view. For example, if a user does not wish to see a news program, the image of an announcer speaking into the camera will immediately indicate that this is not a desirable channel.

Because the user may have to scroll through the complete sequence of channels a number of times before deciding which of a few desirable shows he wants to see, the user will have to pass through the undesired news programs a number of times. This makes program selection more difficult, as well as time consuming.

One possible way to make channel selection less time consuming is to limit the number of channels available. Many television receivers are equipped with a "favorite channel" feature. This feature allows a user to program a number of favorite channels that are a subset of the complete series of available channels. Favorite channel selections may be added or deleted to suit a particular user's taste. The list of favorite channels remains unchanged throughout the viewing day.

The number of available channels may also be reduced by inhibiting access to channels. Many cable television systems allow users to block certain channels at certain times of the day, or at anytime, unless the user enters a password. Such systems allow parents to control access by their children to programming the parents find objectionable. Blocking channels reduces the time required to scan the available channels however, the user may wish to consider viewing programs on a blocked channel while surfing.

Limiting the number of selectable channels using a "favorite" list or by blocking certain channels reduces the time required to select a channel. These techniques, however, have certain drawbacks. Different viewers in a household may have varied tastes in programming. Thus, the favorite channels of one member may be undesirable to another. A viewer may have different viewing needs throughout the viewing day. Situation comedies or nightly news programs may be desirable during so-called prime-time, while full length movies may be desirable in the late evening. Maintaining multiple "favorite" lists to accommodate these preferences would add unnecessary complexity to the system.

SUMMARY OF THE INVENTION

It is therefore an object of the present invention to provide a channel selection device that allows a user to select a desired program more conveniently than with known channel selection devices.

It is another object of the present invention to provide a channel selection device that allows a user to deselect a channel from a series of channels so that subsequent scrolling through the series of channels skips the deselected channel.

It is a further object of the present invention to provide a channel selection device where deselected channels remain deselected for a period of time calculated to correspond with the end of a programming timeslot.

It is a still further object of the present invention to provide a channel selection device that records program schedule information and calculates the period of time to deselect a channel from a series of channels using this recorded program information.

According to a first aspect of the invention there is provided a television receiver equipped to receive coded signals from a hand-held remote control device. The remote control device has buttons to control the receiver to increment and decrement through a sequence of channel numbers and also a deselect button. The function of the deselect button is to deselect whichever channel is currently displayed on the television receiver. When the series of channels are again scanned using the increment or decrement buttons the deselected channel is skipped. A timing device calculates the time remaining until the end of a programming timeslot, which typically ends on the half-hour. The timing device causes the deselected channel to again become available in the sequence of channels at the end of the current programming timeslot. In this manner a user disables the display of programs that he has determined are not desirable. After the end of the undesirable program the user can again inspect that channel.

According to a second aspect of the present invention there is provided a television receiver equipped to receive commands from a remote control device. Among the commands available are channel increment, channel decrement, and deselect as described according to the first aspect. The television receiver is also equipped to receive and record programming information. This programming information may be a so-called electronic program guide (EPG) broadcast over a separate transmission channel or with a channel signal in the vertical blanking interval. According to this aspect of the present invention when a channel is deselected using the deselect command that channel remains deselected until the end of the program currently displayed when the deselect command was given. By using EPG information programs of any length may be deselected.

DETAILED DESCRIPTION

Figure 1:
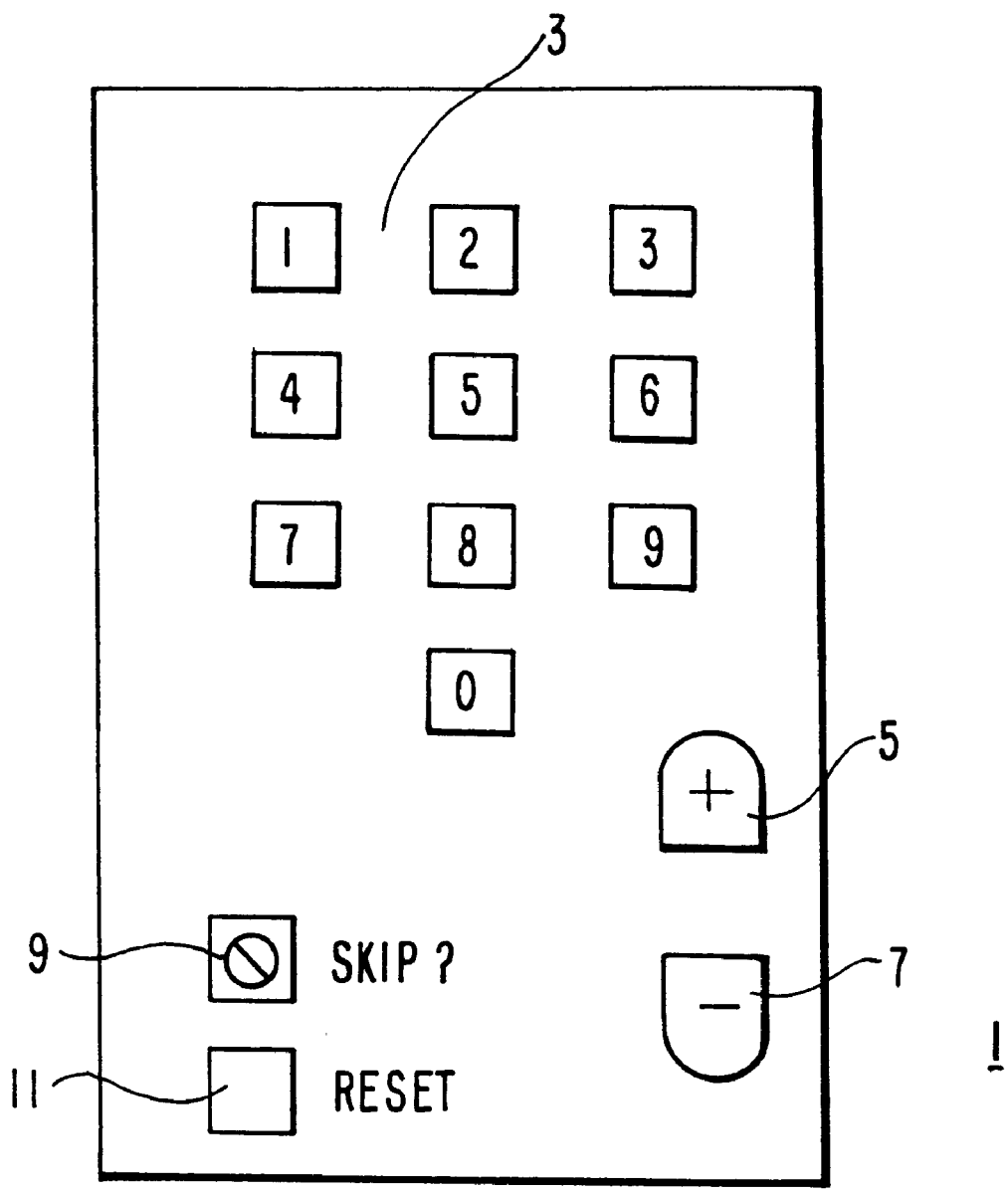
FIG. 1 shows a remote control device according to a first embodiment of the present invention.

FIG. 1 shows a remote controller 1 for a television receiver (not shown) according to the present invention. The controller 1 includes an increment button 5 and a decrement button 7. Pressing the increment 5 or decrement 7 buttons causes the controller 1 to transmit a "channel up" or "channel down" command, respectively.

The controller also has a deselect button 9 that causes the controller 1 to store a number indicating the currently displayed channel in a memory along with data indicating when the end of a timeslot for the program displayed on that channel will occur. For example, assuming most television programs begin and end on the half-hour and the deselect button is pressed at 7:23 p.m., while the displayed channel is channel number 5, then channel 5 will be deselected for 7 minutes, until 7:30 p.m.

After deselecting a channel the controller 1 causes the receiver to switch to the next or previous channel in the sequence of channels. If that next or previous channel has already been deselected then the controller will continue switching to subsequent channels until it reaches a channel that has not been deselected.

The operation of the controller 1 will be explained with reference to the flow charts shown in FIGS. 2(a) and 2(b).

Operation begins at step S1. It is assumed that the television receiver is turned on and a viewer is watching a channel number N.

At step S1 the channel number N is stored by the controller 1. At step S2 the controller 1 determines whether either of the channel scanning buttons 5, 7 are pressed. If one of the channel scanning buttons 5, 7 is pressed, then an increment flag I or a decrement flag D, respectively, is set at step S3. If the I flag is set, then step S4 directs the system to step S5 where the channel number N is increased by one. Otherwise, step S4 directs control to step S6 where the channel number N is decreased by one.

At step S7 the system determines whether the channel N has been previously deselected. If that channel has not been deselected, control passes to step S8 where it is determined whether the channel deselect button 9 has been pressed. If the deselect button 9 is not pressed, the receiver is commanded to display that channel at step S9 and the flags I and D are reset at step S10. Control returns to the top of the flowchart.

Figure 2A:
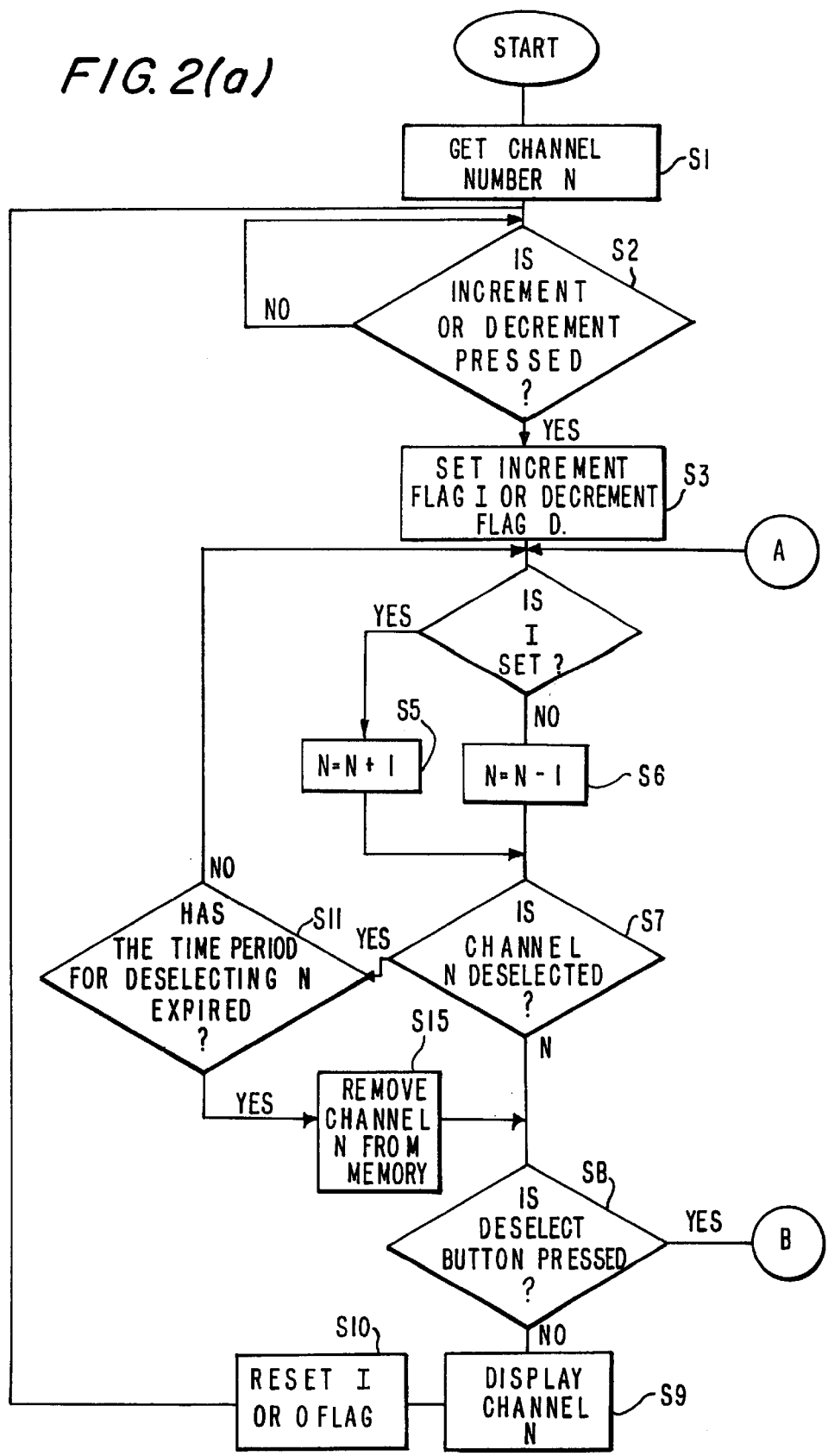
FIGS. 2(a) and 2(b) show a flowchart illustrating the operation of the first embodiment of the present invention.
Figure 2B:
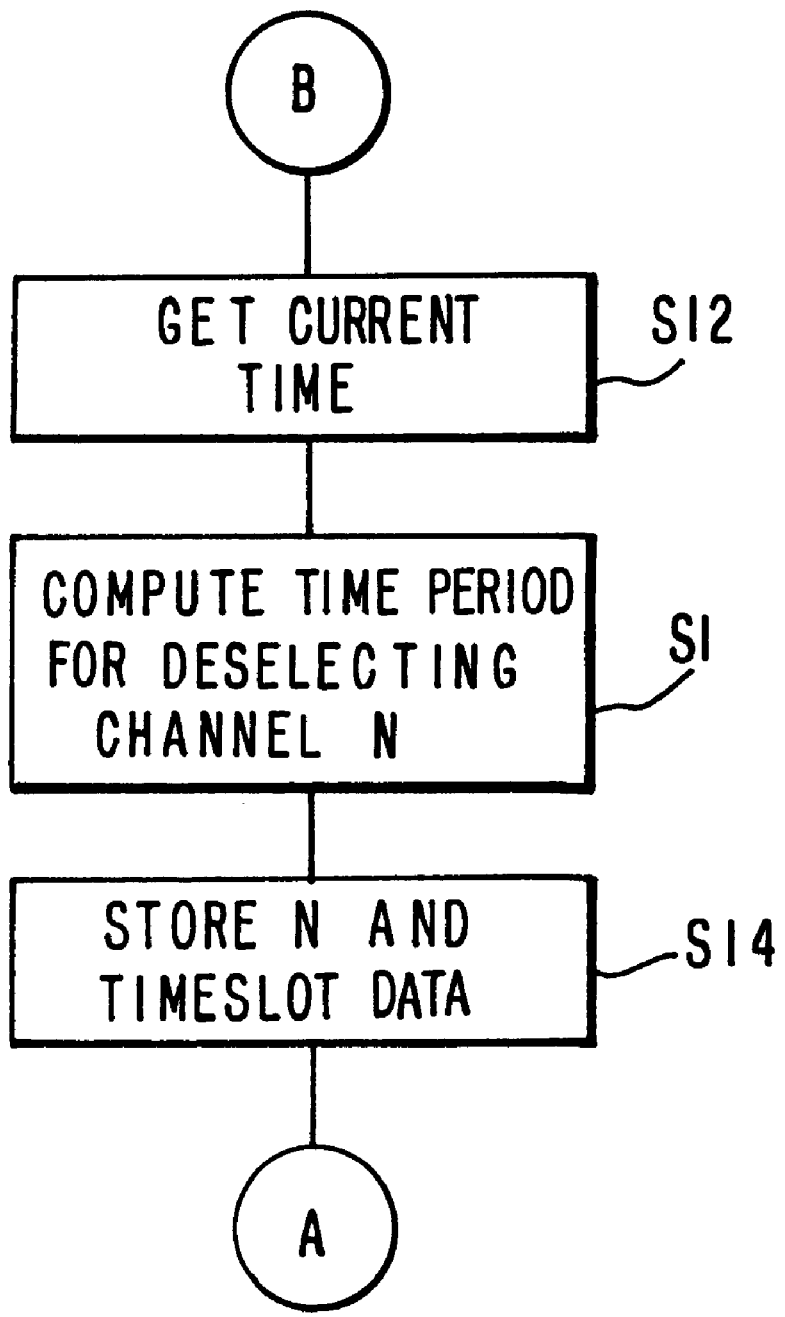

At step S8, if the deselect button 9 is pressed, control is directed to step S12 shown in FIG. 2(b). The current time is determined at step S12. The time until the end of the current timeslot for channel N is determined at step S13. The value N is stored in a memory (not shown) along with data indicating the end of the current timeslot. Control then returns to the step S4, shown in FIG. 2(a). Note that flags I or D have not been reset.

Again, step S4 determines whether the I or D flag is set and the next, or previous channel number is selected in either step S5 or S6, as described above. If that newly selected channel has been deselected, step S7 transfers control to step S11.

Step S11 determines whether the timeslot wherein channel N was deselected has expired by retrieving the timeslot data for channel N stored in memory at step S14. If the deselected timeslot for channel N has expired, then step S11 transfers control to step S15. Channel N is removed from memory and control transfers to step S8. If the timeslot for channel N has not expired, then step S11 transfers control to step S4 and the channel number is again incremented or decremented in steps S4, S5 and S6.

Because the I or D flags are only reset when a channel that has not been deselected is displayed, the controller 1 will automatically skip through consecutive deselected channels. In operation, the user first surfs through the series of available channels and indicates which programs are undesirable by deselecting them. The deselected channels are accumulated in memory. When the user next surfs through the channels only those channels that have not been deselected will be displayed. At the end of the timeslot each of the previously deselected channels is removed from memory making them once again available when the user surfs through the channels.

A reset button 11 is provided to remove all deselected channels from memory, thus allowing the user to surf through the complete series of available channels. The reset button 11 is useful when, for example, a second viewer takes command of the controller 1 before the end of the timeslot.

Figure 3:
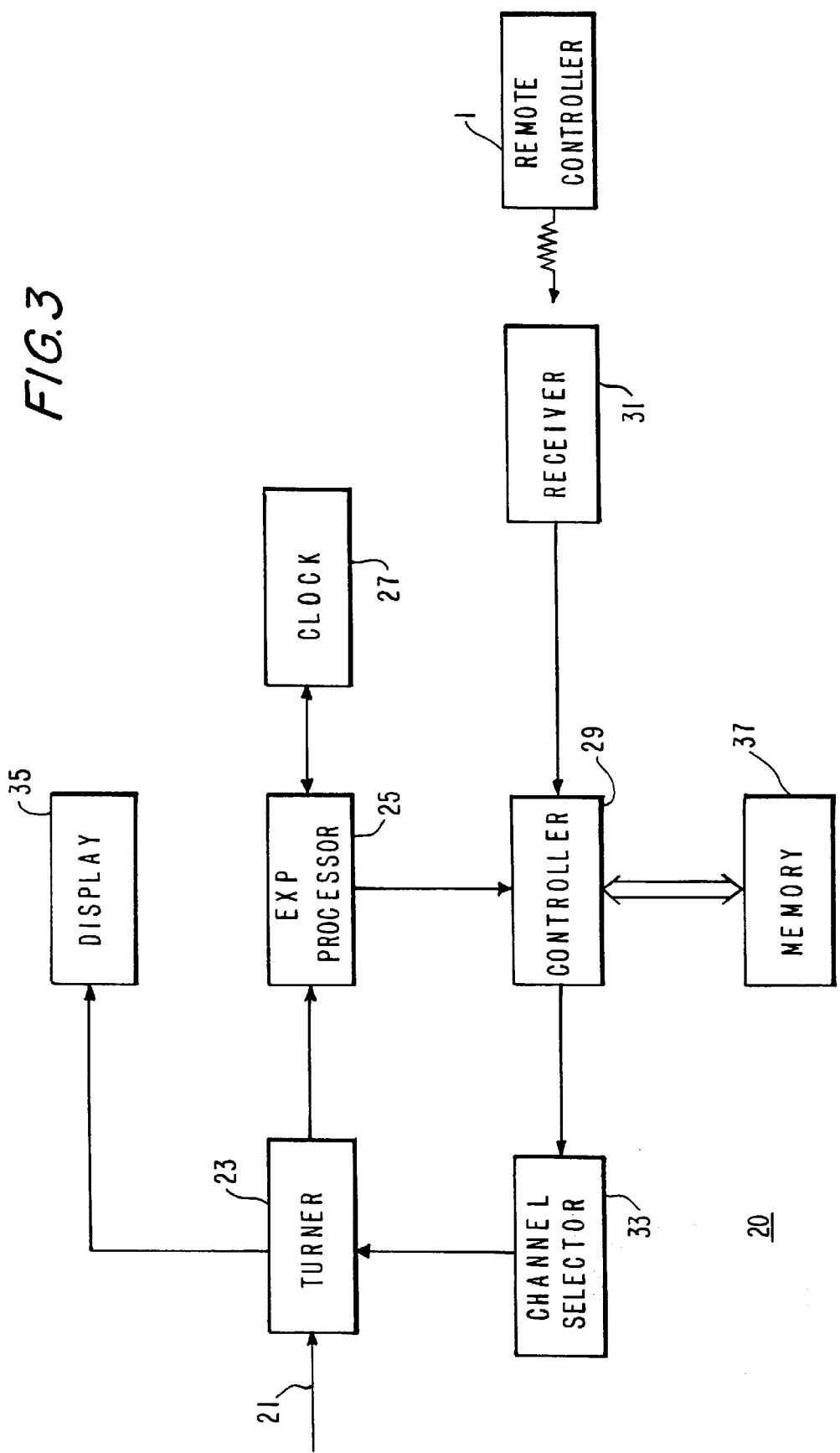
FIG. 3 is a block diagram illustrating a television receiver according to a second embodiment of the present invention.

FIG. 3 shows a television receiver 20 according to a second embodiment of the present invention. A television signal is received from a cable 21 by a tuner 23. The television signal includes a number of television channels as well as programming data. This programming data represents the schedule of programs available on the series of channels. This programming data may be carried on a separate channel or may be multiplexed into unused portions of one of the programming channels, for example during the vertical blanking period.

A preferred method is to include such programming data as part of the so-called Electronic Programming Guide (EPG) described, for example in U.S. Pat. No. 5,583,576 Perlman et al. The EPG signal provides channel, program title, and schedule data for each of the channels available from a signal provider.

The EPG signal is sent to an EPG processor 25 that extracts program schedule information and determines, for each channel available to the tuner 23, the ending time for each program.

The EPG processor 25 also extracts current time information and sends this to the clock 27. The clock 27 keeps track of the current time and uses the time signal from the EPG processor 25 to remain accurate.

The EPG processor 25 sends the schedule information and the current time to a controller 29 to which is connected a memory 37.

A remote controller 1 sends signals to a control receiver 31 to select a channel, to increment or decrement the channel number and to deselect a channel in the manner described in the first embodiment.

Signals received by the control receiver 31 are sent to the controller 29.

The controller 29 causes the channel selector 33 to cause the tuner 23 to demodulate a selected channel. The selected channel is then displayed on the display 35.

Operation of the television receiver 20 is similar to that described by the flowchart of FIGS. 2(a) and 2(b). In this embodiment, however, it is not assumed that each channel's timeslot begins and ends at a fixed time, for example on the half-hour. Here, the timeslot data for each channel is determined on the basis of the EPG data provided by the EPG processor 25.

In this way if a channel is deselected during a full length movie, for example, that channel will remain deselected for the total length of the movie.

The embodiments described above are illustrations of the present invention. Those skilled in the art can vary the above embodiments while remaining within the spirit and scope of the present invention as defined by the appended claims.

What is claimed is:

1. A television receiver channel selection apparatus comprising:
   a television receiver for receiving a plurality of television channels and including a memory, the channels each being designated by a channel number and the channel numbers being arranged in a predefined sequence;
   a channel scanning device for sequentially scanning the predefined sequence of channels according to a user scan input by directing the television receiver to display a next successive or a previous channel of the predefined sequence;
   a channel deselecting device for deselecting a plurality of channels according to a user deselect input by designating a currently displayed channel as deselected and for temporarily removing the deselected channel from the predefined sequence of channels by storing the channel number corresponding to the deselected channel in the memory of the television receiver;
   timeslot determining means for determining a time when a current program being broadcast on the deselected channel ends without any user input; and
   reselecting means for removing the deselected designation of the temporarily deselected channel and for restoring the deselected channel to the predefined sequence of channels by removing the channel number corresponding to the deselected channel from the memory without any user input when the program currently being broadcast on the deselected channel ends; and
   reset means for restoring as one the plurality of deselected channels to the predefined sequence of channels by removing a plurality of channel numbers corresponding to the plurality of deselected channels from the memory according to a user reset input.

2. The channel selection apparatus according to claim 1 wherein the timeslot determining means computes the time from the operation of the deselecting device to the end of a periodic time sequence to cause the deselected channel to be deselected until the end of that periodic time segment.

3. The channel selection apparatus according to claim 2 wherein the periodic time segment is one half hour and where the periodic time segment is synchronized to the clock hour.

4. The channel selecting apparatus according to claim 1 further comprising:
   program schedule determining means for determining an actual program schedule for the predefined sequence of channels and wherein the timeslot determining means computes the end of the deselected channel timeslot on the basis of the actual program schedule.

5. The channel selecting apparatus according to claim 4 wherein the program schedule determining means is a signal processor for extracting electronic program guide data from a broadcast signal.

6. A method for selecting a channel of a television receiver comprising the steps of:
   determining a current channel from a predefined sequence of channels;
   receiving a user command to change the current channel to a next channel in the predefined sequence;
   deselecting a plurality of channels according to a user deselect input by designating the current channel as deselected and temporarily removing the deselected channel from the predefined sequence of channels;
   storing the deselected channel in a memory of the television receiver;
   calculating without any user input a time when a current program being broadcast on the deselected channel is to end;
   removing the deselected designation of the temporarily deselected channel and restoring the deselected channel to the predefined sequence of channels by removing the deselected channel from the memory without any user input when the program currently being broadcast on the deselected channel ends; and
   restoring as one the plurality of deselected channels to the predefined sequence of channels by removing a plurality of channel numbers corresponding to the plurality of deselected channels from the memory according to a user reset input.

* * * * *